Feb. 1, 1966     H. KUMMERMAN     3,232,185
METHODS AND DEVICES FOR MAKING A HYDRAULIC
CONTROL DEVICE FLUID-TIGHT
Filed Aug. 17, 1962     3 Sheets-Sheet 1
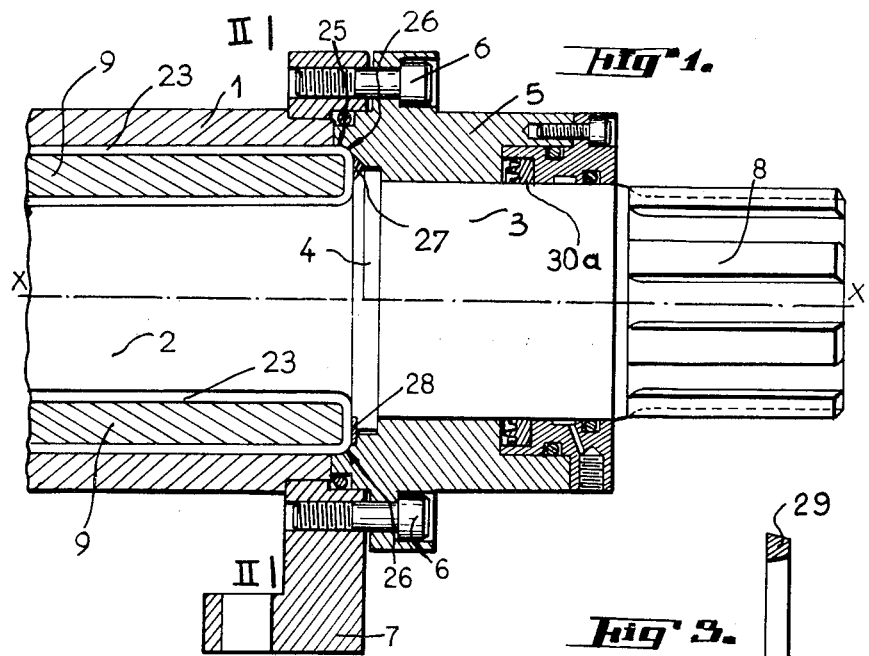
Fig. 1.
Fig. 3.
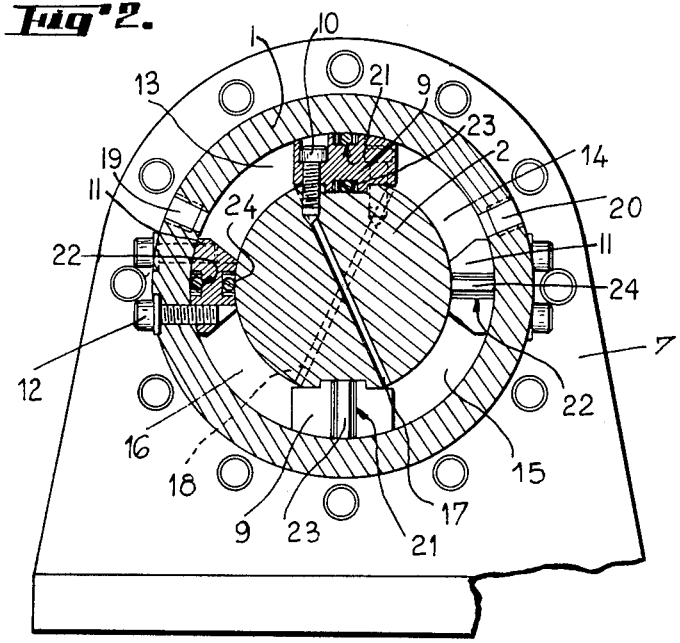
Fig. 2.
INVENTOR
HENRI KUMMERMAN
BY
Kenyon & Kenyon
ATTORNEYS Feb. 1, 1966 H. KUMMERMAN 3,232,185
METHODS AND DEVICES FOR MAKING A HYDRAULIC
CONTROL DEVICE FLUID-TIGHT
Filed Aug. 17, 1962 3 Sheets-Sheet 2
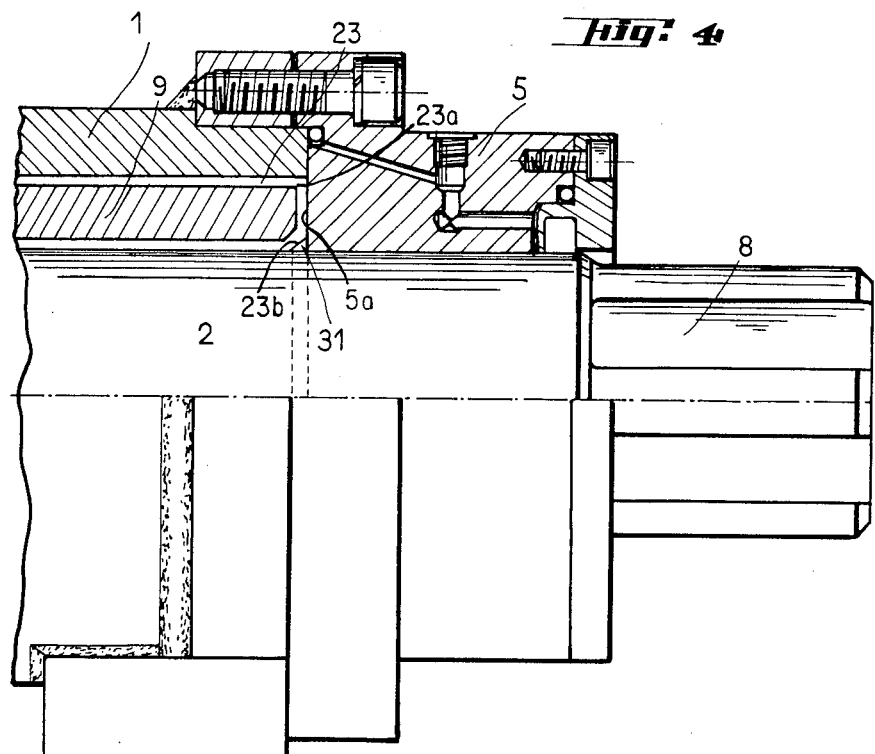
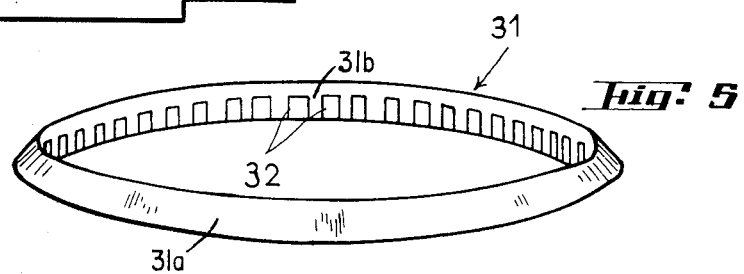
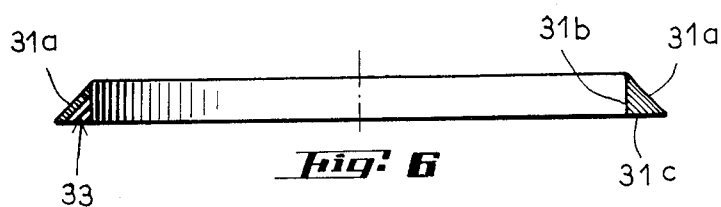
INVENTOR
HENRI KUMMERMAN
BY
Kenyon & Kenyon
ATTORNEYS

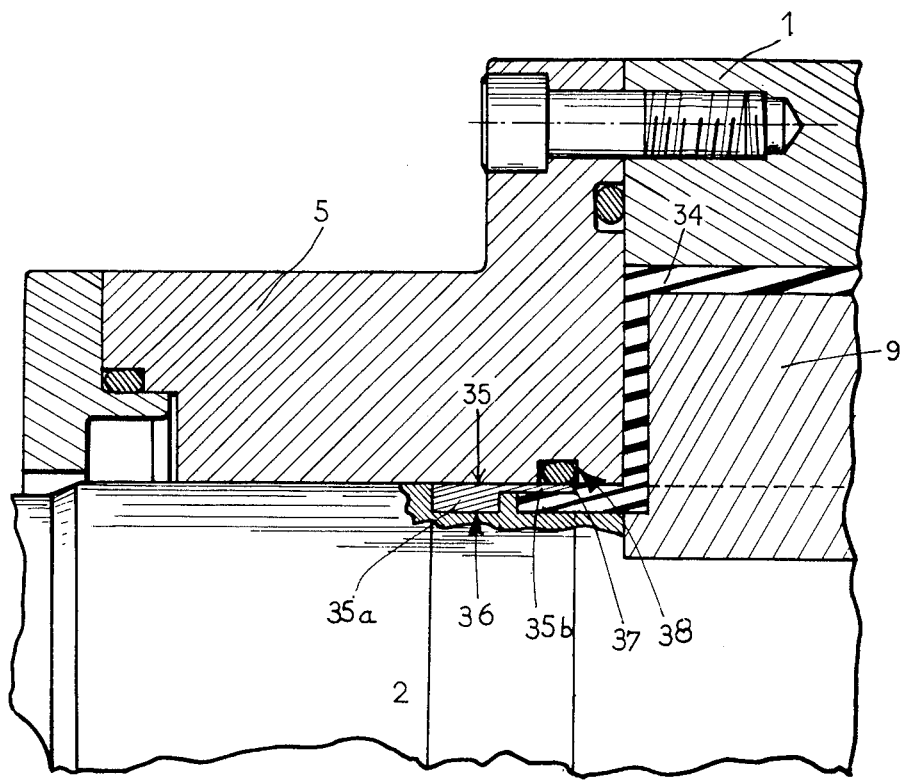

United States Patent Office 3,232,185
Patented Feb. 1, 1966

3,232,185
METHODS AND DEVICES FOR MAKING A HYDRAULIC CONTROL DEVICE FLUID-TIGHT
Henri Kummerman, Paris, France, assignor to MacGregor Comarain, Paris, France, a corporation of France
Filed Aug. 17, 1962, Ser. No. 217,733
Claims priority, application France, May 29, 1962, 899,135
13 Claims. (Cl. 92—125)

The present invention relates essentially to a method for making fluid-tight a hydraulic control driving or like devices comprising a fixed case or housing and an inner rotary member which incorporate between their walls a plurality of chambers separated from each other by partition members mounted the ones on said fixed case or housing and the other on said rotary member, said chambers being adapted to receive a fluid under pressure for driving said rotary member with an alternating rotary motion.

Heretofore, many types of sealing joints or packings have been proposed with a view to prevent any passage or leakage of fluid between the chambers, but none of these known packings or seals ensures a complete fluid-tightness for detrimental leakages are always observed at the ends of the movable member.

It is the object of the method of this invention to avoid this drawback. It consists in mounting on said partitions flexible packing members in the form of endless strips or belts disposed around said partition members on the edges thereof which contact either the case or with said rotary member, whereby the fluid-tightness is effective along the entire outer periphery of said partition members without any break.

According to another feature characterizing this invention the aforesaid packings are fastened by retaining means permitting an easy removal and refitting, for example in the form of grooves or the like formed in said edges, the engagement of said packings in said grooves or their release therefrom being facilitated by their inherent resiliency.

According to a further feature of this invention the wall elements of the fixed case or housing which cooperate with the ends of said partition member are formed with a contour corresponding in shape to said packings when the latter are positioned on said partition members.

Other features and advantages of the invention will appear as the following description proceeds with reference to the accompanying drawings illustrating diagrammatically by way of example typical embodiments of the invention, this invention being also concerned with hydraulic control or driving devices constructed according to the method of this invention, and also, by way of novel industrial products, the motors, machines or the like whenever they are equipped with a device of this character.

In the drawings:

FIGURE 1 is a fragmentary axial section showing a typical embodiment of the device of this invention;

FIGURE 2 is a cross-section taken upon the line II—II of FIGURE 1;

FIGURE 3 is a section showing a rigid annular gasket according to a modified embodiment;

FIGURE 4 is a fragmentary sectional view showing a device equipped with gasket according to this invention;

FIGURE 5 is a perspective view showing the gasket of FIGURE 4;

FIGURE 6 is an axial section showing the gasket of FIGURE 5, and

FIGURE 7 is a fragmentary sectional view showing a device equipped with a gasket according to a modified embodiment of this invention.

FIGURES 1 and 2 of the drawings illustrate a typical application of this invention in the case of a hydraulic control or driving device of the type known under the name of hydraulic hinge. According to this first form of embodiment the device comprises a case or housing 1 of substantially cylindrical configuration having rotatably mounted therein about an axis XX a member 2 also of cylindrical configuration which extends coaxially to said case. The rotary member 2 is formed at its ends with journals or like portions of which only one is visible and designated by the reference numeral 3; this journal 3 is separated from the main portion of member 2 by a collar portion 4 and supported by a bearing 5 secured by screws 6 on a frame structure, flange or like member 7 rigid in turn with the case 1.

The rotary member comprises a splined portion 8 extending beyond the journal portion 3, whereby this member can be operatively connected to another member connected in turn to a device to be controlled or driven.

The diameter of the rotary member 2 is considerably smaller than the inner diameter of case 1 and this member 2 carries two identical partition members 9 secured thereto by means of screws 10. These partition members of parallelipipedic configuration have a substantially rectangular cross-sectional shape and are diametrally opposite; they are parallel to the axis XX. Similarly, two partition members 11 of some configuration as the partition members 9 are secured by screws 12 on the case 1. These partition members 11 are also parallel to the axis XX and diametrally opposite to each other.

The two movable partition members 9 and the two stationary partition members 11 form therebetween four chambers 13, 14, 15 and 16 in which a fluid under pressure delivered. These chambers communicate by pairs through passages 17, 18 formed through the rotary member, and they are connected to the fluid circuit through ports 19 or 20. The hydraulic fluid is fed alternatively (by means of a suitable distributor, not shown) through one of the ports 19 or 20 to these chambers so as to cause the member 2 to rotate about the axis XX until the movable partition members abut against the stationary partition members, whereby an alternating rotary motion is applied to the device.

The movable partition members 9 and the stationary partition members 11 are formed along their edges contacting either the case or the rotary member with a groove or like cavity 21, 22 respectively, preferably of rectangular cross-sectional configuration, this groove extending along the complete outer periphery of each partition member to form a continuous recess adapted to receive the packing consisting of a moulded ring of rubber or other suitable synthetic resilient material, preferably of rectangular cross-section so as to fit in the corresponding recess. The packings carried by partition members 9 and 11 are identical and designated by the reference numerals 23 and 24 respectively. Each packing has the shape of an O or of an endless strip or belt; in other words, it is made as a continuous element without any break or like discontinuity likely to permit the passage of the fluid under pressure during the operation of the device.

Owing to its inherent elasticity, this packing may easily be fitted on the relevant partition member, or removed therefrom in case of wear; to this end it is sufficient to tension or expand the packing to the extent necessary to clear the edges of the partition member before the packing engages for example the groove or like recess formed therein for receiving the packing. Under these conditions it is obvious that the fitting and removal of this packing are particularly simple operations and that this packing is easily interchangeable since the replacement can be effected by simply unscrewing the partition members from the element on which they are secured.

Of course, at the four corners of each partition member each packing such as 23 will assume a curved shape, for example the shape of a 90-degree sector. To ensure a perfect sealing of the ends of rotary member 2 which contact the bearings such as 5 which are rigid with the case 1 these bearings are preferably formed with shoulders 25 having each a rounded fillet 26 so that this fillet corresponds in shape or is complementary, to the outer contour of packing member 23 along the portion thereof which passes round the corner of recess 21.

Due to this specific shape of the fillet 26, a continuous contact between bearing and packing is obtained, as contrasted with what is currently observed in the case of sharp, 90-degree shoulders which are obviously unsuitable for obtaining this continuous contact and, consequently, a reliable fluid-tightness.

A single packing such as 23 will thus seal the joint along the cylindrical wall of the case proper, and on said flat wall of bearing 5 which is rigid therewith. To prevent the fluid under pressure from leaking from one chamber to another by seeping in between the contact surfaces between the rotary member 2 and the fixed bearing 5, thus producing a detrimental by-pass effect, an additional member is provided at the ends of the device for sealing the joint in the radial direction. This additional member consists of a rigid annular gasket, made preferably from a suitable metal, which is disposed coaxially to the axis XX and interposed between said rotary member and said fixed bearing across the packings 23 and 24 carried by the movable and stationary partition members. FIGURE 1 illustrates (see the upper half of the axial section) this additional gasket 27 which in this example has a triangular cross-section. It engages with two faces the fixed bearing 5 and the collar 4, the third face of this gasket 27 contacting the aforesaid flexible packings mounted on the fixed and movable partition members. With this assembly, the gasket 27 is held in position both by the partition members 9, 11 and by the differential pressure prevailing between the chambers and the exterior. The faces of this gasket 27 are as smooth and regular as possible to ensure a proper contact with the adjacent surfaces of the collar and bearing and thus avoid any damage.

In a modified embodiment illustrated in the lower half of the section (FIGURE 1) a flat gasket 28 forming an annulus or washer is substituted for the triangular gasket 27, this alternate element consisting for example of steel. This gasket is made thin enough to be capable of undergoing a certain elastic deformation and ensure a tight contact both with the fixed bearing 5 and with the movable collar 4.

Finally, FIGURE 3 illustrates another modified embodiment of the above-described annular gasket; in this example the cross-section of the gasket 29 has the shape of an isosceles trapezoid and the gasket is formed with a radial slit 30 whereby it can fit on the device without requiring any high-precision machining as in the case of a closed gasket. This gasket 29 is so mounted that the slit 30 is aligned with one of the partition members rigid with case 1 preferably approximately at mid-width of this partition member.

As a consequence of the shape of this gasket the rear face has a smaller surface area than the front face so that a compensating antagonistic action is obtained which however leaves an overload sufficient to avoid any jamming.

Due to the provision of the annular gasket 29 the ring 30a sealing the joint between the journal 3 and bearing 5 may be dispensed with. Thus, a substantial differential pressure develops between the chambers and the zone adjacent to the journal; thus applying an overpressure on the annular gasket which assists in increasing its sealing action.

FIGURE 4 illustrates a device equipped with a gasket 31 having in cross-section the shape of an isosceles triangle; this gasket 31 is interposed between the rotary member and the face 5a of the fixed bearing 5 across the flexible packings 23 and is so disposed that its hypotenuse face 31a (see FIGURES 5 and 6) contacts the inner corners 23b of said packings and its other two faces 31b and 31c engage the shoulder 5a of the bearing 5 and member 2, respectively.

The gasket 31 consists preferably of a metallic ring and is formed with internal recesses 32 disposed at spaced intervals and opening on the two faces 31b, 31c disposed at right angles, so as to form castellations. These recesses consist for example of transverse grooves or the like and have their bottoms 33 preferably parallel to the face 31c of gasket 31. Inserted in each recess is an elementary filling or joint 33 having the same shape as the recess proper, that is, in the case illustrated, the shape of an isosceles triangle. These elementary joints may be of rubber or plastic such as neoprene or any other suitable resilient material.

It will be seen that when the rotary member or shaft 2 is rotated the gasket 31 will prevent the fluid from leaking due to the arrangement and shape of the elementary joints 33 forming a series of small gaskets and adapting themselves to the direction of motion of the shaft.

Practical tests proved that one of these gaskets is perfectly leak-proof even when very high fluid pressure values are attained, such as of the order of 2,800 p.s.i. and more.

FIGURE 7 illustrates another form of embodiment of the packing which is designed more particularly for those cases wherein the flexible packings mounted on the partition members are of the discontinuous type. In this figure the same reference numeral designates the same elements as those of FIGURE 1. In this alternate form of embodiment the fluid-tightness between the rotary member 2 and the case 1 is obtained by means of flexible discontinuous packings 34 mounted on the partition members 9. The radial sealing is obtained by means of an annular gasket 35 solid with shaft 2 and mounted in the vicinity of the packings 34.

This gasket 35 consists of a cylindrical ring made from any suitable metal or alloy, for example brass, and is fitted in a groove 36 formed on the shaft 2.

The gasket 35 comprises a relatively thick portion 35a fitting in the aforesaid groove, and a thinner cylindrical portion 35b fitting between the end of a packings 34 and an annular gasket 37 for example of toroidal configuration, which fits in a groove or like recess 38 formed in the bearing 5 so as to straddle the packings 34.

Of course, many modifications and variations may be brought to the method and device described herein and illustrated in the attached drawings, without however departing from the spirit and scope of the invention. Thus, for example, the fixed or movable partition members may have a shape other than that illustrated, and if desired a plurality of flexible packings may be substituted for the single packing on each movable or fixed partition member.

Finally, the invention should not be construed as being limited to the specific forms of embodiment shown and described, as these are given by way of example only.

What I claim is:

1. A seal for the end of a hydraulic motor comprising an annular gasket the cross section of which is in the form of an isoceles triangle and wherein said gasket is formed on its inner side with recesses disposed at regular spaced intervals and opening on the two equal faces of the gasket which are opposite to said hypotenuse side, whereby said recesses form castellations on each face.

2. A seal according to claim 1, wherein each one of said recesses is in the form of an isosceles rectangular prism having its hypotenuse parallel to the aforesaid hypotenuse face of said gasket.

3. A seal according to claim 2, wherein each one of said recesses is filled with an elementary packing having the same shape and dimensions as the recess itself so as to fill the latter completely.

4. Sealing means for a hydraulic driving device having a stationary cylindrical case provided at either end with a shoulder member which lies in a plane extending at right angle to the axis of said cylindrical case, a cylindrical rotary member in said case, partition members parallel to the axis of said case mounted the one on said case, the others on said rotary member and chambers delimited by said partition members and adapted to receive a fluid under pressure for driving said rotary member comprising a groove on the edges of said partition members which are in movable contact either with said case or with said rotary member, a flexible packing element in the form of a strip surrounding at least a portion of the periphery of said partition members and located in said groove, said packing element being made of mouldable material and having a constant and rectangular cross-section, a rounded fillet forming substantially a quarter circle connecting said shoulder member to said cylindrical case, the body of said packing element registering with said rounded fillet, said sealing means further comprising at either end of said rotary member an annular gasket interposed between said shoulder member and said rotary member and contacting the packings mounted on said fixed and movable partition members.

5. Device according to claim 4, wherein said gasket has a triangular cross-sectional shape and is so dispossed between said rotary member and said case that one of its faces contacts said flexible sealing packings.

6. Device according to claim 4, wherein said gasket is made of resilently deformable material and has the shape of a flat annulus.

7. Device according to claim 4, wherein said gasket has a trapezoid-shaped cross-section and is formed with a radial slit aligned with one of the partition members rigid with said case.

8. Sealing means for a hydraulic driving device having a stationary cylindrical case provided at either end with a shoulder member which lies in a plane extending at right angle to the axis of said cylindrical case, a cylindrical rotary member in said case, partition members parallel to the axis of said case mounted the one on said case, the others on said rotary member and chambers delimited by said partition members and adapted to receive a fluid under pressure for driving said rotary member comprising a groove on the edges of said partition members which are in movable contact either with said case or with said rotary member, a flexible packing element in the form of discontinuous strip located in said groove the end portions of said packing extending axially from said partition members, an annular recess in said rotary member, a cylindrical ring in said annular recess, said cylindrical ring having along one fraction of its height a thinner annular portion straddling said end portions, an annular groove in said case member and a toroidal seal in said annular groove, said toroidal seal contacting said thinner annular portion.

9. Hydraulic driving device having a stationary cylindrical case provided at either end with a bearing member formed with a shoulder portion perpendicular to the axis of said case, a cylindrical rotary member located in said case and supported on said bearing members, partition members of substantially parallelepipedic configuration extending in a direction parallel to the axis of said case, said partition members being mounted respectively on said case and on said rotary member, chambers delimited by said partition members and adapted to receive a hydraulic fluid under pressure for driving said rotary member, a groove on the peripheral surfaces of respective of said partition members which are in movable contact respectively with said case and with said rotary members, a flexible packing element in the form of a strip surrounding at least a portion of the periphery of each of said parallelepipedic partition members and located in said groove thereof, said strip being made of mouldable material, and being formed adjacent said shoulder portion with an external corner and with an internal corner and, at either end of said rotary member, an annular gasket having in cross-section the shape of a right-angled triangle, said annular gasket having its two perpendicular sides respectively in contact with said shoulder portion and with said rotary member, its hypotenuse side being in sliding contact with said internal corner.

10. Device according to claim 9, wherein said annular gasket is made of metallic material such as steel.

11. Device according to claim 9, wherein said annular gasket is formed with recesses disposed at regular spaced intervals and opening on the two sides of the gasket which are opposite to said hypotenuse side.

12. Device according to claim 11, wherein each recess aforesaid is in the form of an isosceles rectangular prism having its hypotenuse parallel to the aforesaid hypotenuse side of the gasket.

13. Device according to claim 12, wherein an elementary packing is inserted in each aforesaid recess, said packing having the same shape and dimensions as the recess itself so as to fill the latter completely.

References Cited by the Examiner

UNITED STATES PATENTS

| | | | |
|---|---|---|---|
| 2,377,674 | 6/1945 | Chisholm | 123—8 |
| 2,459,720 | 1/1949 | Poltorak | 277—227 |
| 2,540,903 | 2/1951 | Moushey et al. | 123—8 |
| 2,550,180 | 4/1951 | Allen | 92—122 |
| 2,633,105 | 3/1953 | Lasater | 92—125 |
| 2,708,907 | 5/1955 | Shafer | 123—8 |
| 2,795,212 | 6/1957 | Shafer | 123—8 |
| 2,798,462 | 7/1957 | Ludwig et al. | 123—8 |
| 2,870,748 | 1/1959 | Hemphill | 92—125 |
| 2,902,009 | 9/1959 | Ludwig et al. | 123—8 |
| 2,934,045 | 4/1960 | Shafer | 123—8 |
| 2,951,470 | 9/1960 | Self | 92—125 |
| 2,953,399 | 9/1960 | Weaver et al. | 277—227 |
| 2,984,221 | 5/1961 | Van Voorhees | 92—122 |
| 3,021,822 | 2/1962 | Rumsey | 123—8 |
| 3,032,020 | 5/1962 | Sneen | 92—122 |

SAMUEL LEVINE, *Primary Examiner.*

JOSEPH H. BRANSON, KARL J. ALBRECHT,
*Examiners.*

F. T. SADLER, *Assistant Examiner.*